(12) United States Patent
McSherry et al.

(10) Patent No.: US 7,716,144 B2
(45) Date of Patent: May 11, 2010

(54) CONSISTENT WEIGHTED SAMPLING OF MULTISETS AND DISTRIBUTIONS

(75) Inventors: Frank D. McSherry, San Francisco, CA (US); Kunal Talwar, San Francisco, CA (US); Mark Steven Manasse, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 532 days.

(21) Appl. No.: 11/726,644

(22) Filed: Mar. 22, 2007

(65) Prior Publication Data

US 2008/0235201 A1   Sep. 25, 2008

(51) Int. Cl.
*G06F 15/18* (2006.01)
*G06F 17/00* (2006.01)

(52) U.S. Cl. .................... 706/12; 706/45; 707/101; 707/102; 707/6; 707/3

(58) Field of Classification Search ............. 706/15; 707/101
See application file for complete search history.

(56) References Cited

U.S. PATENT DOCUMENTS

| | | | | |
|---|---|---|---|---|
| 4,074,358 | A * | 2/1978 | Caputo et al. | 702/69 |
| 5,909,677 | A | 6/1999 | Broder et al. | 707/3 |
| 5,974,481 | A | 10/1999 | Broder | 710/49 |
| 6,119,124 | A | 9/2000 | Broder et al. | 707/103 |
| 6,269,362 | B1 | 7/2001 | Broder et al. | 707/4 |
| 6,349,296 | B1 | 2/2002 | Broder et al. | 707/3 |
| 6,539,391 | B1 * | 3/2003 | DuMouchel et al. | 707/101 |
| 7,136,844 | B2 | 11/2006 | Wrobel et al. | 707/1 |
| 2002/0123979 | A1 | 9/2002 | Chaudhuri et al. | 707/1 |
| 2003/0061233 | A1 | 3/2003 | Seth et al. | |
| 2004/0267456 | A1 * | 12/2004 | Brunner et al. | 702/19 |
| 2005/0060643 | A1 | 3/2005 | Glass et al. | 715/501.1 |
| 2005/0125621 | A1 | 6/2005 | Shah | 711/173 |
| 2006/0066617 | A1 | 3/2006 | Antanies | 345/440 |
| 2006/0074963 | A1 | 4/2006 | Mihaila et al. | 707/102 |
| 2006/0122998 | A1 | 6/2006 | Bar-Yossef et al. | 707/5 |
| 2006/0242217 | A1 | 10/2006 | Bartels | 708/270 |
| 2007/0016666 | A1 | 1/2007 | Duffield et al. | 709/223 |

OTHER PUBLICATIONS

Gibbons, P. B. and Matias, Y. 1998. New sampling-based summary statistics for improving approximate query answers. SIGMOD Rec. 27, 2 (Jun. 1998), 331-342.*

Broder, A. Z. 2000. Identifying and Filtering Near-Duplicate Documents. In Proceedings of the 11th Annual Symposium on Combinatorial Pattern Matching (Jun. 21-23, 2000). R. Giancarlo and D. Sankoff, Eds. Lecture Notes In Computer Science, vol. 1848. Springer-Verlag, London, 1-10.*

(Continued)

*Primary Examiner*—David R Vincent
*Assistant Examiner*—David H Kim
(74) *Attorney, Agent, or Firm*—Woodcock Washburn LLP

(57) ABSTRACT

Techniques are provided that identify near-duplicate items in large collections of items. A list of (value, frequency) pairs is received, and a sample (value, instance) is returned. The value is chosen from the values of the first list, and the instance is a value less than frequency, in such a way that the probability of selecting the same sample from two lists is equal to the similarity of the two lists.

18 Claims, 6 Drawing Sheets

OTHER PUBLICATIONS

Efraimidis, P. S. and Spirakis, P. G. 2006. Weighted random sampling with a reservoir. Inf. Process. Lett. 97, 5 (Mar. 2006) (Available online Dec. 2005), 181-185.*

Broder, A. Z., Glassman, S. C., Manasse, M. S., and Zweig, G. 1997. Syntactic clustering of the Web. Comput. Netw. ISDN Syst. 29, 8-13 (Sep. 1997), 1157-1166.*

C. K. Wong and M. C. Easton. An Efficient Method for Weighted Sampling without Replacement. SIAM J. Comput. vol. 9, Issue 1, pp. 111-113 (1980).*

Marsaglia, G. 1963. Generating discrete random variables in a computer. Commun. ACM 6, 1 (Jan. 1963), 37-38.*

Richard A. Kronmal and Arthur V. Peterson, Jr. On the Alias Method for Generating Random Variables from a Discrete Distribution. The American Statistician, vol. 33, No. 4 (Nov. 1979), pp. 214-218.*

Olken, F. and Rotem, D. 1986. Simple Random Sampling from Relational Databases. In Proceedings of the 12th international Conference on Very Large Data Bases (Aug. 25-28, 1986). W. W. Chu, G. Gardarin, S. Ohsuga, and Y. Kambayashi, Eds. Very Large Data Bases. Morgan Kaufmann Publishers, San Francisco, CA, 160-169.*

Manasse, "Finding similar things quickly in large collections," http://research.microsoft.com/research/sv/PageTurner/similarity.htm, 2004, downloaded from the internet on Mar. 19, 2004, 4 pages.

Bisbal, J. et al., "Generalising the Consistent Database Sampling Process", http://www.tecn.upf.es/~jbisbal/publications/Csi2000.pdf, 7 pages.

Jain, N. et al. "TAPER: Tiered Approach for Eliminating Redundancy in Replica Synchronization", Usenixfast '05 Technical Paper, http://www.usenix.org/event/fast05/tech/full_papers/jain/jian_html, 24 pages, Last Changed Nov. 16, 2005.

Zollmann, A. et al., "A Consistent and Efficient Estimator for Data-Oriented Parsing", *Journal of Automata, Languages and Combinatorics,* 2005, 10(2/3), 367-388.

* cited by examiner

CONSISTENT WEIGHTED SAMPLING OF MULTISETS AND DISTRIBUTIONS

BACKGROUND

Large collections of documents typically include many documents that are identical or nearly identical to one another. Determining whether two digitally-encoded documents are bit-for-bit identical is easy (using hashing techniques, for example). Quickly identifying documents that are roughly or effectively identical, however, is a more challenging and, in many contexts, a more useful task.

The World Wide Web is an extremely large set of documents. The Web has grown exponentially since its birth, and Web indexes currently include approximately five billion web pages (the static Web being estimated at twenty billion pages), a significant portion of which are duplicates and near-duplicates. Applications such as web crawlers and search engines benefit from the capacity to detect near-duplicates. For example, it may be desirable to have such applications ignore most duplicates and near-duplicates, or to filter the results of a query so that similar documents are grouped together.

SUMMARY

Techniques are provided that identify near-duplicate items in large collections of items. A list of (value, frequency) pairs is received, and a sample (value, instance) is returned. The value is chosen from the values of the first list, and the instance is a value less than frequency, in such a way that the probability of selecting the same sample from two lists is equal to the similarity of the two lists.

A technique for determining an element such as a near-duplicate item assigns a weight S(x) to each element x in the set of elements S, and generates a sample in the form (x, y), where x is one of the elements in the set and y is a weight between 0 and the weight S(x) corresponding to that element. A hash value is generated for each of the samples, and the sample that has the greatest hash value is outputted.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Overview

Figure 1:
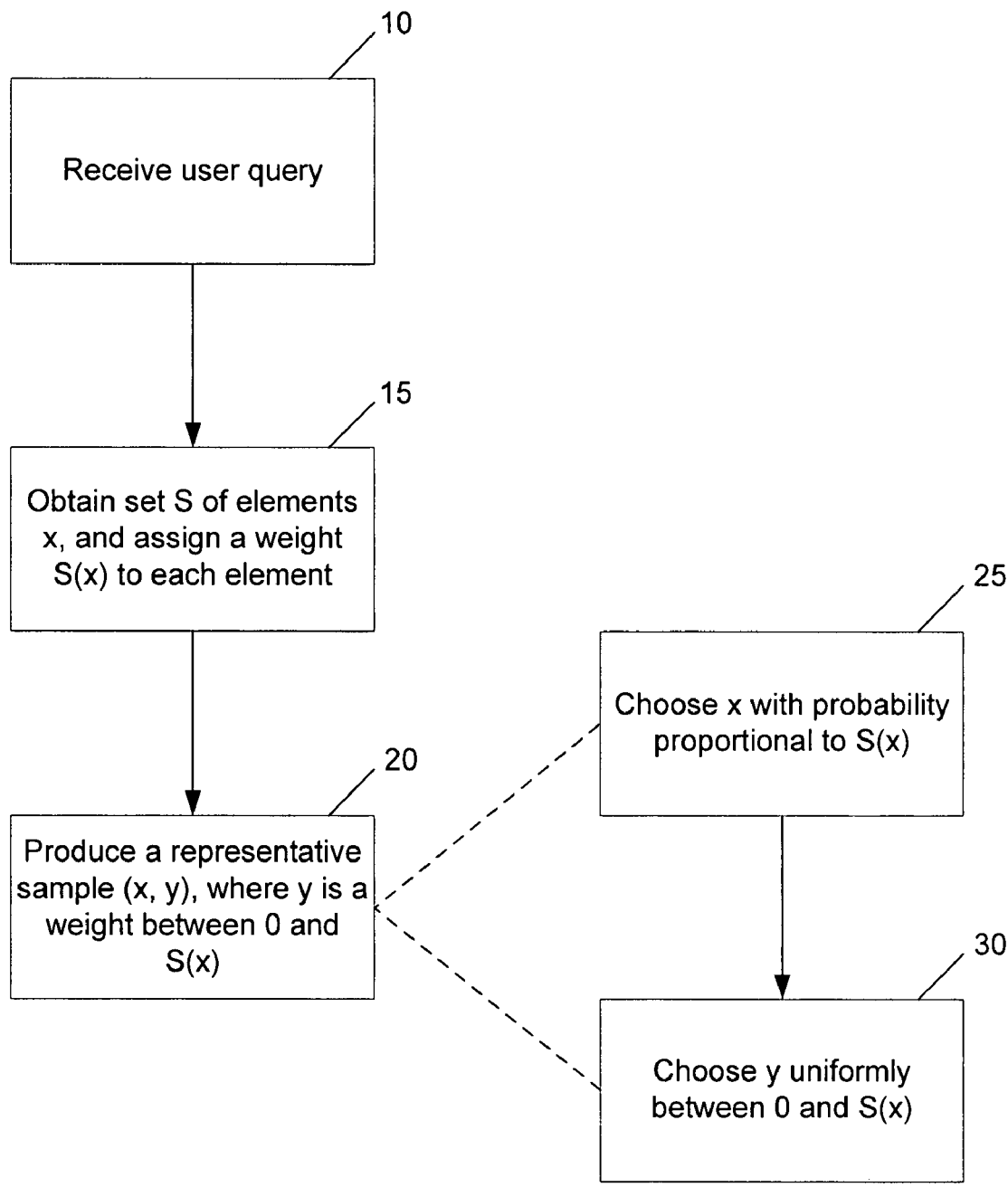
FIG. 1 is a flow diagram of an example sampling method.

"Shingling" or "shingleprinting" techniques have been developed to address the problem of finding similar objects in large collections, such that approximately equivalent pages can be identified and eliminated. In the shingling approach, a document is reduced to a set of features that are sufficiently representative of the document, so that two very similar documents will share a large number of features.

"Consistent sampling" refers to sampling processes with the property that any sample that is selected from a set is also selected for any subset containing the sample. Such processes lead to the mathematical property that the probability that two documents yield the same sample equals the Jaccard similarity. Consistent sampling allows a user to draw representatives from sets, substantially compressing their representation while still retaining the ability to approximately determine the similarity between any two. The conventional approach is to hash each element in the set and retain the pre-image of the greatest hash. Such techniques are amenable to application to large collections of sets, because the samples can be drawn in advance and grouped together for purposes of finding highly similar sets; these samples can be much smaller than the original sets.

In many contexts, it is not desirable to sample uniformly from the set, but rather in proportion to a set of predetermined weights. Terms may be weighted by their frequency in the document, and discounted by their frequency in the corpus. One is more likely to select informative terms, arriving at a more accurate estimate for semantic similarity. Consistent sampling can be applied in this setting, by replicating each word a number of times proportional to its weight, although it introduces substantial additional computation, and constrains the weights to be integral.

For example, it was thought that the best way to sample from multisets was to replace each element of a multiset by a pair of the element, and its placement in the list of identical elements (e.g., <cat, cat, dog> would expand to {(cat, 1), (cat, 2), (dog, 1)} as a set), and then use previously-known sampling methods. This can be executed in time linear in the size of the original multiset, if repetitions are fully spelled out. If, however, the multiset is presented by a list of elements and the number of occurrences, this expansion may be exponential in the size of the original, which is undesirable.

Recently, it has been shown that the computational burden can be substantially reduced, giving a sampling algorithm that takes time proportional to the sum of the logarithms of the weights, assuming all weights are at least one. This conventional approach emulates the direct replication method by producing, for element x, the sequence of representatives of x whose hash values exceed all previous representatives. From such an element $i_j$ with hash h, the distance to the next index $i_{j+1}$ has a geometric distribution with mean $1/(1-h)$, and the next hash value is uniform on [h, 1]. As the indices grow exponentially, the element $i_j<S(x)$ is obtained with the greatest hash value in time log(S(x)), where S is a weight and S(x) is the weight of an element x.

While this represents a substantial improvement over simple replication, these conventional techniques are still constrained by the required normalization and logarithmic dependency on the normalized weights. In essence, it can require time proportional to the logarithm of the largest ratio of weights. As weightings can go both up and down, sometimes substantially so, these average values need not be negligible.

Techniques are provided that identify near-duplicate items in large collections by producing a different but mathematically equivalent choice as the methods of the previous work, but with a reduction in computation time.

According to an embodiment, a list of (value, frequency) pairs is received, and a sample (value, instance) is returned. The value is chosen from the values of the first list, and the instance is a value less than frequency, in such a way that the probability of selecting the same sample from two lists is equal to similarity of the two lists.

Similarity is defined as the sum over all values of the lesser frequency divided by the sum over all values of the greater frequency. This is desirably performed by a randomized process in which every value has probability of being selected proportional to its frequency, and every instance less than the frequency has equal probability of selection.

Consistency comes from guaranteeing that when a sample (value, instance) is chosen from a list of pairs, that same sample would be chosen from any list with the same or fewer values, and a value for the selected sample which is at least as large as the selected instance. Thus, the sample is uniform according to weight (weighted sampling) where each weight corresponds to an importance factor of the sample, and consistent (whatever it picked, it will always pick as long as it is a candidate and as long as there are no new candidates).

An example technique uses power-of-two ranges (or any other exponentially distributed way), determining an upper bound for when the best sample might cease to be best (allowing for repeatable uniformity), and selecting a lower bound (for consistency of sampling). In a sequence of frequencies that would give rise to new maxima in hash values, a power-of-two range up or down has a 0.5 probability of containing at least one new maximum. Uniform picking is then performed to see if the next lower frequency falls into the same range, and, if so, at what value. Thus, given an input frequency, the expected distance to the nearest larger range containing a maximum is 2, and the number of maxima within that range is less than 2. This means that, given knowledge of the power-of-two range containing a frequency, the next larger frequency at which the maximum changes can be determined in expected constant time.

When selecting a random value from the set of available values, it is desirable to do so uniformly, weighted by frequency. Probability theory states that, when looking at the maximum of k independently selected random values in the range $[0,1\}$, the probability that it is below x is $x^k$. This cannot be used directly because of the need for consistency of sampling. For example, if (cat, 1) is chosen from {(cat, 1), (cat, 2), (dog, 1)}, then (cat, 2) must not be chosen by the same selection function just because (cat, 3) is added, although (cat, 3) might be.

The value corresponding to (cat, 1) must be larger than that for (cat, 2) and (dog, 1) for it to have been chosen. There will be some greatest number of cats that could be added to the set such that (cat, 1) would remain selected. Such a number is determined by a rounding-up process, which determines that greatest number. Because each frequency k (for the sake of uniformity) has to have probability 1/k of supplanting the previous, and because if k is chosen when starting at j, that same k must be chosen for all frequencies between j and k. The bounding range, the value, and the trial number can be used to seed a pseudo-random number generator for the purpose of determining the positions of entries in the range. A simplified version is to repeatedly pick uniform random numbers in the range from 0 to $2^k$, until a number less than $2^{k-1}$ is chosen. With the set of numbers thus described, the earliest descending sequence is desirably used. This works both for integer and floating-point choices of random numbers.

Given that, it is now known how many virtual copies of each value are present, and a value is then selected from among them. The selection can be made by considering the cumulative distribution of second maxima, given that the maximum changes at the upper bound. A pseudo-random luckiness factor is picked for each value, and the maximum is selected proportional to the distribution. Various distribution functions may be used to approximate similarity.

Example Techniques

An example technique provides for consistent weighted sampling taking expected constant time per non-zero weight. The weights themselves can be arbitrary non-negative real values. Such an approach emulates the behavior of the replication approach, incorporating the generalization to the continuous case. However, such an example technique allows random access to the sequence of indices ij whose hash value exceeds those of all lesser indices. For an arbitrary weight S(x), one can go directly to the relevant region of the sequence and produce the appropriate representative index.

An example sampling technique is described with respect to the flow diagram of FIG. 1. At step 10, a user query is received. At step 15, a set S of elements x is obtained, and a weight S(x) is determined or assigned to each x. A representative sample is produced at step 20 of the form (x, y) where x is the selected object and y is a positive weight value that is at most S(x). Desirably, the distribution over (x, y) will be uniform over (x, y) satisfying $0<y \leq S(x)$. That is, x is chosen with probability proportional to S(x) at step 25, and y is chosen uniformly between 0 and S(x) at step 30. Note that elements in the universe but not in the set (i.e., elements with weight 0) will not be chosen as samples.

The example technique is performed in expected time linear in the number of positive weights, without significant dependence on the values of the weights, assuming that the representation of weights allows for the extraction of the integer part of the base-two logarithm of a weight in constant time; in standard representations of non-denormalized floating point numbers, this is the extraction of the exponent field.

Two necessary and sufficient conditions for a sampling process to yield the Jaccard similarity as the probability of sample collision, for any weights S are:

1. Uniformity: A sample (x, y) is distributed uniformly over those pairs satisfying $y \leq S(x)$; and
2. Consistency: For any weights T dominated by S, if (x, y) is selected for S and $y \leq T(x)$, then (x, y) is selected for T. T(z) is at most S(z) for all z.

Also, for any uniform and consistent sampling scheme,

Probability [sample(S)=sample(T)]=[$\Sigma_x$ min(S(x), T(x))]/[$\Sigma_x$ max(S(x), T(x))].

Figure 2:
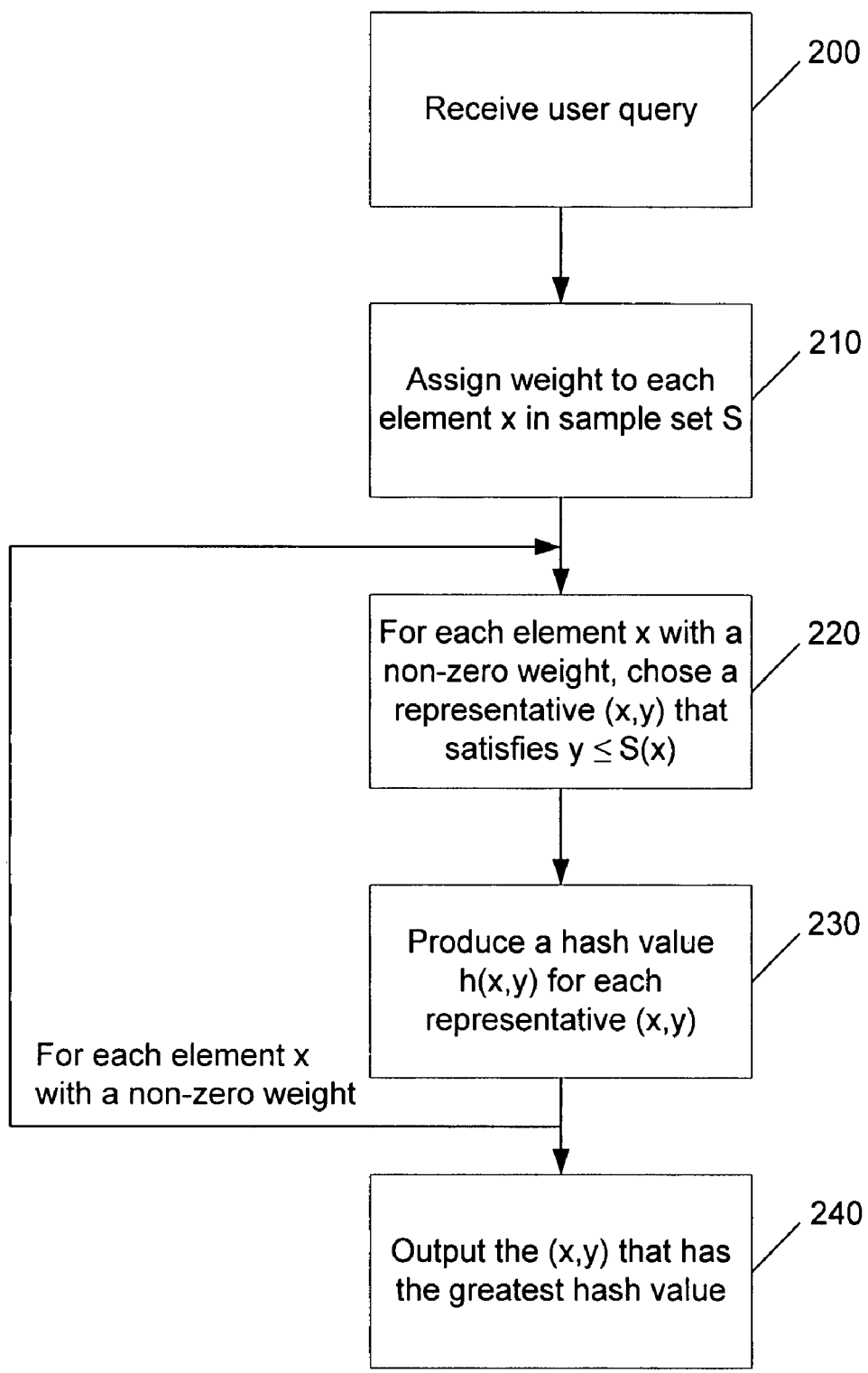
FIG. 2 is a flow diagram of another example sampling method.

An example sampling technique comprises the following steps, as described with respect to FIG. 2. At step 200, a user query is received. At step 210, weights are assigned to each element x in the sample set S. At step 220, for each element x with a non-zero weight, a representative (x, y) is chosen that satisfies $y \leq S(x)$. Then, at step 230, for each representative (x, y), a hash value h(x, y) is produced. The pair with the greatest hash value is then outputted or reported at step 240.

Thus, for every element in the set, a representative is produced (e.g., (cat, 2.7)). Then it is determined which hash value would have produced the representative. It is then determined considering the hash values for all elements of the set, which hash value is the largest; the representative corresponding to that hash value is used (e.g., (cat, 2.7)).

More particularly, regarding index production, the sequence of active indices is produced. Active indices are those whose hash values exceed the hash values of any lesser index. The chosen y value for x will then be the greatest active index below S(x). The sequence will extend infinitely in both directions, towards 0 as well as infinity, and will allow effective random access to any region of the sequence.

A property that is desirably leveraged is that the distribution over active indices in any interval is independent from the distribution over active indices in a disjoint interval. $(0,\infty)$ is decomposed into intervals of the form $(2^{k-1}, 2^k]$, and it is determined which indices are active independently, using randomness keyed off of k. Using such a scheme, any such interval may be accessed and the active indices therein may be analyzed.

The following GenerateSamples technique is used to produce the active indices that enclose S(x). "Salt" is a string used to seed a random number generator to produce a family of random numbers, and to indicate the purpose for the random number, so that multiple random numbers may be computed that correspond to the same power-of-two range and element.

GenerateSamples (x, k, salt)
1. random.seed (x, k, salt);
2. sample=$2^k$*random.uniform(0.0, 1.0);
3. while (sample>$2^{k-1}$)
 (a) record (sample);
 (b) sample=sample*random.uniform (0.0, 1.0);

The collection of these descending sequences will conceptually form the full sequence, though effective random access to any point in the sequence remains available. As each interval is non-empty with probability exactly ½ and of constant expected length, the values immediately above or below any weight S(x) can be determined in expected constant time by computing $\log_2(S(x))$ and exploring the sequence up or down until a suitable element is found, since the sum of the geometric series $1+½+¼+\ldots$ is 2.

Figure 3:
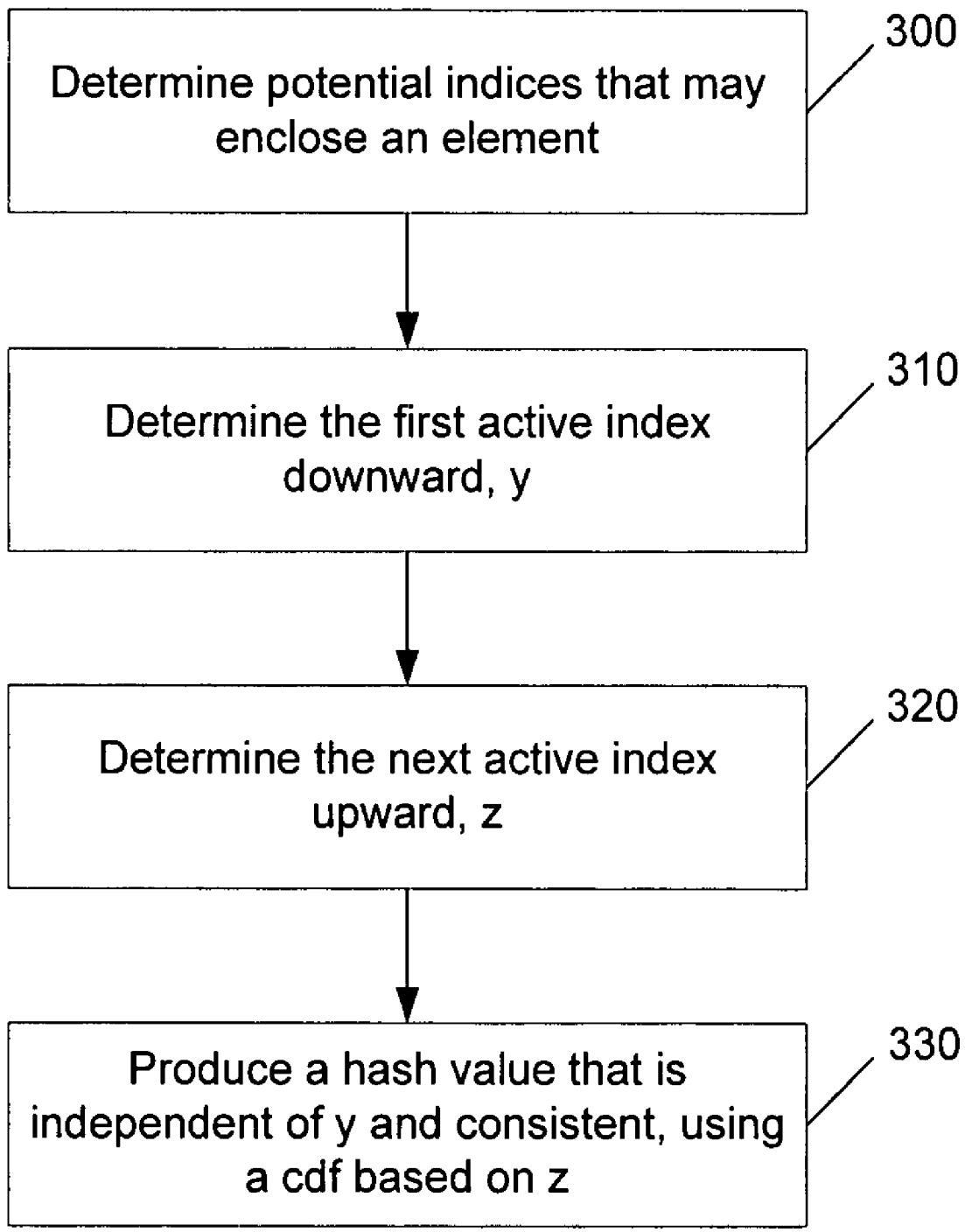
FIG. 3 is a flow diagram of an example method of producing a hash value that may be used in sampling.

For example, for (cat, 50), the GenerateSamples technique may be used, as described with respect to FIG. 3. The interval of powers of 2 that it falls between is determined. Indices that are possible candidates in that interval are then determined, at step 300. The first active index downward (y) and the next active index upward (z) are determined, at steps 310 and 320, respectively. The lower index is y and the upper index is z. These two indices sandwich the weight.

Regarding hash production, the produced hash value is desirably independent of y, but nonetheless consistent (e.g., if two people were to pick the same sample, the same hash value would also be selected). This may be achieved by determining the first active value z greater than S(x), which may be used to define and sample from a cumulative density function over hash values, at step 330. Given z, for example, the following cumulative density function (cdf) may be used over hash values:

$$cdf_z(a) = a^z + a^z z \ln(1/a). \quad (1)$$

To produce a hash value from $cdf_z$, a value $\beta_x$ is chosen uniformly at random from [0, 1], and h(x, y) is set equal to $cdf^{-1}_z(\beta_x)$, which can be determined through a binary search as $cdf_z$ is monotone. The value $\beta_x$ is chosen from a source of randomness keyed only off of x, not S(x), y, or z. The distribution (1) above has the property that for any S(x), when $cdf_x$ is integrated over the possible values z>S(x) using the density $S(x)/z^2$, the result yields a cumulative density function, $a^{S(x)}$, of the maximum of S(x) independent random values.

Figure 4:
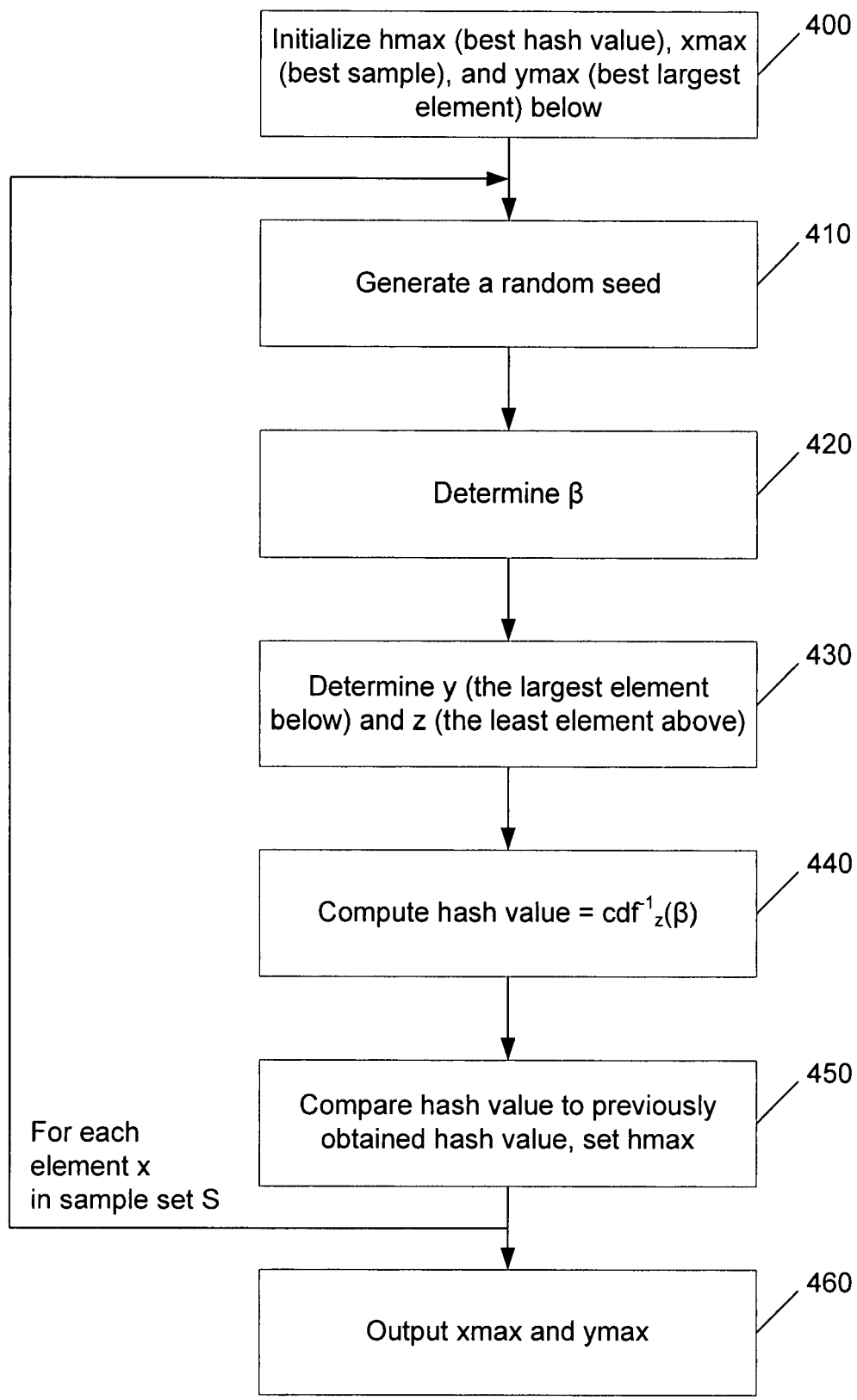
FIG. 4 is flow diagram of another example sampling method.

Based on the above described structure (and again using "salt" to distinguish different members of the family of sampling functions and different uses of randomness), the pseudo-code for an example sampling method is provided, and described with respect to FIG. 4:

ConsistentSample (collection of weights S, salt or random seed)
1. hmax=0; xmax=null; ymax=0. At step 400, initialize hmax, xmax, and ymax, where hmax is the best hash value, xmax is the best sample, and ymax is the best y, thus far seen.
2. foreach (x:nonzero S(x)). The following is performed for each element.
 (a) random.seed(x, salt). At step 410, generate a random seed.
 (b) β=random.uniform(0.0, 1.0). At step 420, determine a β, which is the cumulative density function and is directed to the chance or randomness that gets added so that the hash value for z elements will not be the same. β is selected between 0 and 1.
 (c) (y, z)=ActiveIndices (x, S(x), salt). At step 430, determine the largest element below and the least element above an element. ActiveIndices generates samples to find the largest element below and the least element above.
 (d) Compute h=$cdf^{-1}_z(\beta)$ via binary search. At step 440, determine the inverse of the cumulative density function for β and set it to a hash value. In other words, the hash value on the inverse of a cdf function is computed. Set the hash value equal to the value of a, such that when a is put in, the value of the hash that leads to the β is obtained.
 (e) If (h>hmax)
  {hmax=h; xmax=x; ymax=y. At step 450, compare the hash value to the previously obtained hash value, and set to the new best value.
3. Return the sample (xmax, ymax). Return or output the value of x and y, at step 460.

The example ActiveIndices method desirably uses GenerateSamples (above) to produce the active indices that enclose S(x).

Optimizations and Enhancements

It is desirable to improve the performance of the various sampling techniques. An example implementation of the techniques described above consumes a fixed, but substantial, amount of computation resources. Notably, the production of random bits is expensive, and the inversion of $cdf_z$ may require a numerical, rather than analytic, approach.

Figure 5:
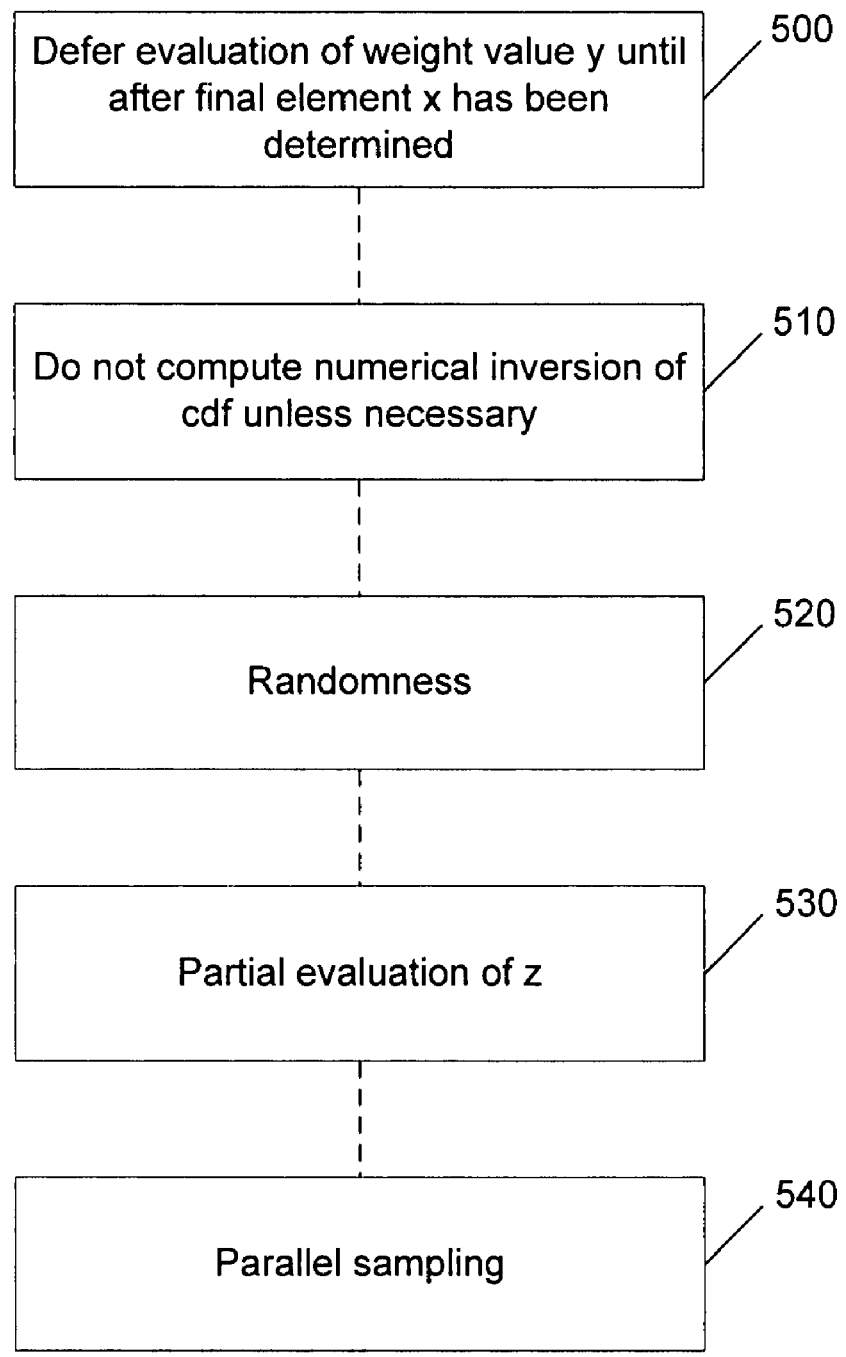
FIG. 5 is a diagram of example optimization and enhancements.

Consequently, several techniques, listed in FIG. 5 and described below, can be used to accelerate the production of samples, to use randomness more carefully, to avoid unnecessary computation, and to amortize certain resources across parallel sampling instances. These example techniques may be used separately or in combination with each other.

An example optimization may be to defer the evaluation of y as shown in block 500. Determining which element x is to be returned does not actually require the determination of which weight value y will accompany it, but rather only requires the value z. Consequently, the determination of weight value y may be deferred until x has been determined and is ready to be returned.

Another example optimization may be to avoid numerical inversion as shown in block 510. The hash value h(x, y) may be defined as the pre-image of a uniformly random value β under the density function $cdf_z$. The density function is not easily invertible, and instead the monotonicity of the cumulative density function may be used to perform a binary search over the hash values. Searching to a sufficient degree of accuracy is expensive, and as it is done for each term it quickly becomes a computational bottleneck.

However, a hash value for every x does not actually need to be computed as only the x having the least value needs to be determined. Thus, rather than compute and compare $cdf^{-1}_z(\beta)$ to the best hash h seen so far, the monotonicity of $cdf_z$ may be used, which implies $cdf^{-1}_z(\beta) > h$ if and only if $\beta > cdf_z(h)$. Using this test, it may be efficiently determined if $cdf^{-1}_z(\beta)$ needs to be computed before actually doing so. This reduces the number of numerical inversions to the number of times the best sample changes in the course of processing the document.

The number of numerical inversions that are performed is constant in the special case when the weights in a document are distributed according to a Zipfian distribution, where the frequency of the ith most common term proportional to $1/i^\alpha$ where $\alpha > 1$. Intuitively, under such term distributions, the fraction of terms beyond the ith most frequent is bounded by a function of i, independent of the document length.

The probability that the ith term will lead to an improved hash value is the ratio of its weight $1/i^\alpha$ to the total of weights considered before it, $\Sigma_{j \leq i} 1/j^\alpha$: Probability [sample (S)=i]=$i^\alpha$/$\Sigma_{j \leq i} 1/j^\alpha < 1/i^\alpha$. The expected number of inversions is the integral over i of the probability of inversion. As the integral of $1/i^\alpha$ is bounded for $\alpha > 1$, the expected number of inversions is similarly bounded.

Randomness may also be used for optimization as shown in block 520. As an alternate approach to explicitly investigating each interval $[2^{k-1}, 2^k]$ to see if it is non-empty, which happens with probability exactly ½, a bit vector may be produced whose kth bit indicates non-emptiness of the sequence in that interval. By examining this bit vector, it could be determined which values of k merit a call to GenerateSamples, thereby avoiding any exploration of empty intervals. The GenerateSamples method desirably would be modified to ensure that whenever it is invoked it produces at least one sample, as promised, which can be achieved by setting the first bit of the first uniform random number.

Additionally this first bit may be captured and used for the first bit in the next sample, to provide an indication that the coming value will fall below $2^{k-1}$ before the value is even produced. Doing likewise with each subsequent sample avoids the production of many of the random variables that are not needed.

A partial evaluation of z may be used as another example optimization as shown in block 530. The use of a bit vector is described above, from which the highest interval $[2^{k-1}, 2^k]$ in which z could lie may be determined, followed by a call to GenerateSamples to determine where in the interval it would land. These steps may be viewed as producing the exponent and mantissa of z separately. In light of the above, and by virtue of the monotonicity of $cdf_z$ with respect to z, computation of the mantissa may be avoided if it can be determined that even the largest possible value of z would not compare favorably to the current best hash h. For example, compare $\beta$ against $cdf_2^k(h)$, and only evaluate the mantissa if $\beta$ is larger.

Another example optimization involves parallel sampling as shown in block 540. When trying to produce many samples in parallel, many $\beta$ values and many z values are used. It is not necessary to evaluate each $\beta$ and z fully, and rather than generating a large number of fully formed $\beta$ and z values, the randomness may be parceled out in small amounts to each of the parallel instances, providing each $\beta$ and z with enough randomness to quickly rule out those x that will not lead to viable samples. Additional randomness may be produced for those $\beta$ and z values that may lead to viable samples.

For example, take 8 bits of randomness for each sample, with 128 bits leading to 16 parallel samples. An adaptive scheme takes the same 128 bits and reads out $\beta$ values by proceeding through the bits, and emitting a number when it first sees a zero. That is, it takes the sequence 10110100 and outputs 10, 110, 10, and 0. This has the advantage of terminating early on samples that are unlikely to be close to one, and continuing deeply into those that are.

Exemplary Computing Arrangement

Figure 6:
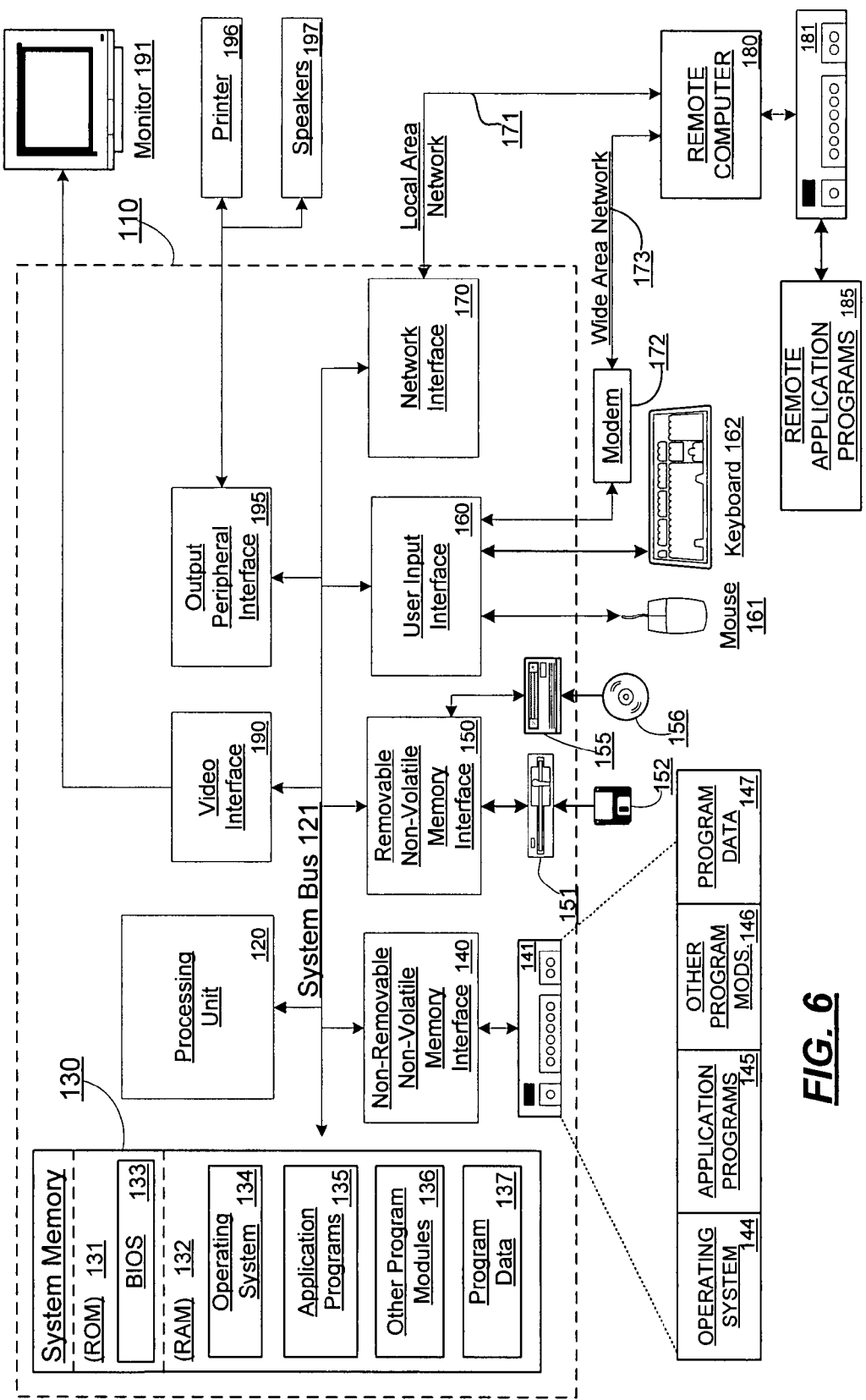
FIG. 6 is a block diagram of an example computing environment in which example embodiments and aspects may be implemented.

FIG. 6 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

The computer 110 may also include other removable/non-removable, volatile/nonvolatile computer storage media. By way of example only, FIG. 6 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 6, provide storage of computer readable instructions, data structures, program modules and other data for the computer 110. In FIG. 6, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 6. The logical connections depicted in FIG. 6 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 6 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of determining a feature from a document comprising a set of features, the method comprising:

assigning a weight $S(x)$ to each feature in the document comprising the set of features; and generating a sample in the form $(x, y)$, wherein x is one of the features in the document comprising the set of features and y is a weight between 0 and the weight $S(x)$ corresponding to that feature and wherein y is determined in part by producing a sequence of active indices and identifying a largest one of the active indices that is below the weight $S(x)$ in part by computing $\log_2(S(x))$.

2. The method of claim 1, wherein generating the sample comprises selecting the feature with a probability proportional to the weight $S(x)$ corresponding to that feature.

3. The method of claim 2, further comprising uniformly choosing y.

4. The method of claim 1, further comprising obtaining the set of features in response to a search engine query.

5. The method of claim 1, further comprising outputting the sample.

6. The method of claim 1, further comprising generating a hash value for the sample.

7. The method of claim 1, further comprising repeating the generating to obtain a plurality of samples.

8. The method of claim 7, further comprising generating a hash value for each of the samples.

9. The method of claim 8, further comprising outputting only the sample that has the greatest hash value.

10. A method of determining a feature from a document comprising a set of features, the method comprising:
assigning a weight $S(x)$ to each feature in the document comprising the set of features;
generating a sample in the form $(x, y)$, wherein x is one of the features in the document comprising the set of features and y is a weight between 0 and the weight $S(x)$ corresponding to that feature; and
determining a plurality of indices that potentially enclose the sample at least in part by computing $\log_2(S(x))$, wherein determining the indices is based on intervals of powers of two; and
determining which of the intervals of powers of two are empty using a vector comprising a plurality of bits, wherein each bit indicates whether a corresponding interval is empty, and avoiding determining the indices based on the intervals that are determined to be empty using the vector.

11. The method of claim 10, further comprising determining a lower index y and an upper index z that enclose the sample from the plurality of indices.

12. The method of claim 11, further comprising generating a hash value of the sample.

13. The method of claim 12, wherein the hash value is independent of y and consistent.

14. The method of claim 12, wherein generating the hash value comprises producing the hash value from a cumulative density function.

15. A method of determining a feature from a document comprising a set of features, the method comprising:
assigning a weight $S(x)$ to each feature in the document comprising the set of features;
for each feature having a non-zero weight $S(x)$, selecting a representative $(x, y)$, where y is a positive weight value that is not greater than $S(x)$, wherein selecting the positive weight value of y comprises producing a sequence of active indices, identifying a largest one of the active indices that is below the non-zero weight $S(x)$ and a smallest one of the active indices that is above the non-zero weight $S(x)$ at least in part by computing $\log_2(S(x))$, and selecting the identified largest one of the active indices that is below the non-zero weight $S(x)$, as the positive weight value of y;
for each representative $(x, y)$, generating a hash value $h(x, y)$; and outputting only the representative $(x, y)$ corresponding to a maximum hash value $h(x, y)$.

16. The method of claim 15, wherein generating the hash value comprises producing the hash value from a cumulative density function based on z and a random number.

17. The method of claim 15, further comprising after generating the hash value, comparing the hash value to a previously stored maximum hash value, and if the hash value is greater than the previously stored hash value, then storing the hash value as the maximum hash value.

18. The method of claim 15, further comprising deferring the determination of the largest one of the active indices that is below the non-zero weight $S(x)$ until immediately before outputting only the representative $(x, y)$ corresponding to the maximum hash value $h(x, y)$.

* * * * *